United States Patent [19]

Geck et al.

[11] Patent Number: 5,981,659
[45] Date of Patent: Nov. 9, 1999

[54] PRECROSS-LINKED SILICONE ELASTOMER PARTICLES WITH ORGANOPOLYMER SHELL AS FORMULATION CONSTITUENT IN POWDER COATING MATERIALS

[75] Inventors: Michael Geck, Burghausen; Walter Goeblmeier, Wurmannsquick; Bernward Deubzer, Burghausen; Ekkehard Patrick, Burgkirchen, all of Germany

[73] Assignee: Wacker-Chemie GmbH, Munich, Germany

[21] Appl. No.: 09/029,552

[22] PCT Filed: Sep. 26, 1996

[86] PCT No.: PCT/EP96/04208

§ 371 Date: Mar. 6, 1998

§ 102(e) Date: Mar. 6, 1998

[87] PCT Pub. No.: WO97/12005

PCT Pub. Date: Apr. 3, 1997

[30] Foreign Application Priority Data

Sep. 26, 1995 [DE] Germany .................... 195 35 824

[51] Int. Cl.$^6$ ................................................. C08L 83/00
[52] U.S. Cl. .................... 525/100; 525/902; 525/106; 525/474; 525/479; 525/63
[58] Field of Search ................................. 525/902, 106, 525/474, 479, 63, 100

[56] References Cited

U.S. PATENT DOCUMENTS

| | | |
|---|---|---|
| 5,223,586 | 6/1993 | Mautner et al. . |
| 5,227,435 | 7/1993 | Kang et al. . |
| 5,280,098 | 1/1994 | Witucki et al. . |
| 5,587,424 | 12/1996 | Langstein et al. ................ 525/63 |

FOREIGN PATENT DOCUMENTS

| | | |
|---|---|---|
| 0275051 | 7/1988 | European Pat. Off. . |
| 0492376 | 3/1995 | European Pat. Off. . |

*Primary Examiner*—Melvyn I. Marquis
*Assistant Examiner*—Mark W. Milstead
*Attorney, Agent, or Firm*—Brooks & Kushman P.C.

[57] ABSTRACT

The invention relates to the use of precrosslinked silicone elastomer particles with an organopolymer shell as the formulation constituent in powder coating material compositions based on thermoplastic or thermosetting binding agents, the silicone elastomer particles containing (a) 5 to 95% by weight, in relation the total weight of the copolymerisate, of a nucleus polymer of the general formula $(R_wSiO_{2/2})_x \cdot (RSiO_{3/2})_y \cdot (SiO_{4/2})_z$ with x=5 to 99.5 mol %, y=0.5 to 95 mol %, z=0 to 30 mol %, and (b) 5 to 95% by weight, in relation to the total weight of the copolymer, of a shell made of an organopolymer of ethylenically mono or multi-unsaturated monomers, R standing for identical or different monovalent $C_1$–$C_6$ alkyl or alkenyl residues or substituted hydrocarbon residues.

12 Claims, No Drawings

PRECROSS-LINKED SILICONE ELASTOMER PARTICLES WITH ORGANOPOLYMER SHELL AS FORMULATION CONSTITUENT IN POWDER COATING MATERIALS

TECHNICAL FIELD

The invention relates to the use of precrosslinked silicone elastomer particles with an organic-polymer shell as a formulation constituent in powder coatings, and to powder coating compositions based on thermoplastic or thermosetting binders comprising precrosslinked silicone elastomer particles with an organic-polymer shell.

BACKGROUND OF THE INVENTION

Powder coatings consist of solid binders based on thermoplastic or thermosetting polymers, such as epoxy, polyurethane, acrylic or polyester resins, on pigments and on further additives, for example crosslinking catalysts. These compositions are applied in powder form to predominantly metallic substrates. The thermoplastic or thermosetting binders mentioned are generally hard but brittle; to improve the film properties, therefore, impact modification of the polymer systems is frequently necessary.

In order to obtain good impact strengths while retaining the existing, desired polymer properties such as hardness, dimensional stability and mechanical strength, the impact modifier must be incorporated into the thermoplastic or thermosetting systems in the form of separate, discrete microphases with optimized particle size and particle morphology. This can be carried out in a controlled and reproducible manner only by employing the impact modifier in the form of particles with a defined size and a defined size distribution as blend component. In addition, the particulate modifier must be highly compatible with the polymer matrix. In that case, the domain sizes of the modifier phase are defined exactly by way of the particle diameter. Only in the case of complete phase separation does no undesirable plastification of the polymer matrix occur, which would result in a loss of or adverse effect on the properties of the polymer matrix such as hardness, dimensional stability and mechanical strength.

Silicones are known as modifiers for thermoplastics or thermosets and are of particular interest since they not only increase the impact strength but also improve low-temperature flexibility, weathering resistance, resistance to temperature change and chemical resistance of thermoplastic and thermosetting organic-polymer systems. Generally disadvantageous, however, is the fundamental incompatibilty of silicones with organic polymers. Because of this incompatibility, the use of silicone oils and silicone resins as additives to binders for powder coatings generally gives rise to problems with processing, such as contamination in the mixing and extrusion equipment. On application it is possible for defects in flow to occur, and migration of the silicones produces problems with adhesion and in the context of overcoatability.

In U.S. Pat. No. 5,280,098, epoxy-functional silicone resins are described as sole binder or as binder constituent, in combination with organic resins, for the formulation of powder coatings. The introduction of the epoxide groups is intended to improve the elasticity and the compatibility with the organic resin. The concept of controlled microphase separation cannot be realized with the epoxy-functional silicone resins, since they do not have a particulate structure with a defined particle diameter.

U.S. Pat. No. 5,227,435 proposes the substitution in powder coatings of the polyester binder by silicone-modified polyesters which are obtained by condensing OH-functional siloxanes with glycol, followed by esterification with carboxylic acids and reaction with anhydrides. EP-A 275051 relates inter alia to acrylate-grafted silicone resins which are described as binders for powder coatings having an improved profile of properties of the coating films obtainable therewith.

A disadvantage of the procedure according to U.S. Pat. No. 5,227,435 and EP-A 275051 is that the silicone copolymers described therein are described as binders for replacing the conventional thermoplastics or thermosets. Consequently, the silicone constituent must be incorporated into the respective polymer system by complex chemical reaction, each specific binder system having to be newly synthesized from scratch. In addition, the contamination problems typical of silicones are not ruled out by such binder systems. Here too, there is no controlled microphase separation, since the modifiers concerned again do not have a particulate structure.

EP-A 217257 relates to noncrosslinked or crosslinked diorganosiloxane polymers grafted with organic polymer. These powders are processed per se and are not employed as additives. The processing, carried out by means of rolling, calendering and kneading, produces elastomeric rubber masses but not pulverulent coating compositions based on thermoplastic or thermoset powders.

The object was therefore to provide powder coating compositions which are based on conventional thermoplastic or thermosetting binders and which have improved impact strength and weathering resistance while at the same time retaining the existing, desired polymer properties of the binder such as hardness, dimensional stability and mechanical strength.

It has surprisingly been possible to achieve this object by the use of precrosslinked silicone elastomer particles with an organic-polymer shell as a formulation constituent in powder coatings based on thermoplastic or thermosetting binders.

One subject of the invention is the use of precrosslinked silicone elastomer particles with an organic-polymer shell as a formulation constituent in powder coating compositions based on thermoplastic or thermosetting binders, the silicone elastomer particles comprising a) from 5 to 95% by weight, based on the total weight of the copolymer, of a core polymer of the general formula $(R_2SiO_{2/2})_x \cdot (RSiO_{3/2})_y \cdot (SiO_{4/2})_z$ where x=5 to 99.5 mol %, y=0.5 to 95 mol %, z=0 to 30 mol %, and b) from 5 to 95% by weight, based on the total weight of the copolymer, of an organic-polymer shell of mono- or polyethylenically unsaturated monomers, and R denoting identical or different monovalent alkyl or alkenyl radicals having 1 to 6 carbon atoms, aryl radicals or substituted hydrocarbon radicals.

Another subject of the invention are powder coating compositions based on thermoplastic or thermosetting binders which comprise as formulation constituent precrosslinked silicone elastomer particles with an organic-polymer shell, the silicone elastomer particles comprising a) from 5 to 95% by weight, based on the total weight of the copolymer, of a core polymer of the general formula $(R_2SiO_{2/2})_x \cdot (RSiO_{3/2})_y \cdot (SiO_{4/2})_z$ where x=5 to 99.5 mol %, y=0.5 to 95 mol %, z=0 to 30 mol %, and b) from 5 to 95% by weight, based on the total weight of the copolymer, of an organic-polymer shell of mono- or polyethylenically unsaturated monomers, and R denoting identical or different monovalent alkyl or alkenyl radicals having 1 to 6 carbon atoms, aryl radicals or substituted hydrocarbon radicals.

The silicone elastomer particles with an organic-polymer shell which were employed as a formulation constituent, and processes for their preparation, are described in EP-A 492376 (U.S. Pat. No. 5,223,586). Precrosslinked silicone elastomer particles means that these particles are crosslinked by way of units $(RSiO_{3/2})$ and $(SiO_{4/2})$. The silicone elastomer particles with an organic-polymer shell preferably comprise a) from 20 to 80% by weight, based on the copolymer total weight, of a core polymer $(R_2SiO_{2/2})_x.(RSiO_{3/2})_y.(SiO_{4/2})_z$ where x=50 to 99 mol %, y=1 to 50 mol %, z=0 to 20 mol %, and b) from 20 to 80% by weight, based on the copolymer total weight, of an organic-polymer shell of mono- or polyethylenically unsaturated monomers, and R being as defined above.

The finely divided graft copolymers preferably have a mean particle diameter of from 10 to 300 nm, particularly preferably from 30 to 150 nm. The particle sizes may fluctuate within the abovementioned range; preferably, a monomodal particle-size distribution is present with a maximum polydispersity index of $\sigma_2=0.2$.

The radicals R are preferably alkyl radicals, such as the methyl, ethyl, n-propyl, isopropyl, n-butyl, sec-butyl, amyl, hexyl radical; alkenyl radicals, such as the vinyl, allyl, butenyl and 1-hexenyl radical; aryl radicals, such as the phenyl radical; or substituted hydrocarbon radicals, such as halogenated hydrocarbon radicals, mercaptoalkyl radicals, cyanoalkyl radicals, aminoalkyl radicals, acyloxyalkyl radicals, hydroxyalkyl radicals.

Particularly preferred radicals are methyl, ethyl, propyl, phenyl, vinyl, allyl, 1-hexenyl, 3-meth-acryloxypropyl and 3-mercaptopropyl, less than 30 mol % of the radicals in the siloxane polymer being vinyl, 3-methacryloxypropyl or 3-mercaptopropyl groups.

Monomers employed for the organic polymer compoment b) are preferably acrylates or methacrylates and mono- or diesters of fumaric and maleic acid with aliphatic alcohols and diols having 1 to 10 carbon atoms, acrylamides and methacrylamides, acrylonitrile, styrene, p-methylstyrene, α-methylstyrene, divinylbenzene, vinyl acetate, vinyl propionate, maleimide, vinyl chloride, mono- and divinyl ethers, ethylene, butadiene, isoprene and chloroprene. Particular preference is given to styrene and to acrylates and methyacrylates of aliphatic alcohols having 1 to 4 carbon atoms, for example methyl (meth)acrylate, butyl (meth) acrylate and glycidyl-(meth)acrylate. Both homopolymers and copolymers of the abovementioned monomers are suitable as organic polymer component.

The polysiloxane graft base is prepared according to the emulsion polymerization process by metering in the corresponding mixture of monomeric silanes of the type $R_aSi(OR')_{4-a}$, where a=0, 1 or 2, or, if desired, low molecular mass siloxanes of the general formula $(R_2SiO)_n$ where n=3 to 8, to an agitated emulsifier/water mixture. The radical R has the definitions already given. R' represents alkyl radicals having 1 to 6 carbon atoms, aryl radicals or substituted hydrocarbon radicals, with methyl, ethyl and propyl radicals being preferred. The silane or the silane mixture or silane/siloxane mixture is added in metered form. The emulsion polymerization is carried out at a temperature of from 30 to 90° C., preferably from 60 to 85° C., and preferably at atmospheric pressure. The pH of the polymerization mixture is from 1 to 4, preferably from 2 to 31.

Examples of suitable silanes are, for silanes of the general formula $R_2Si(OR')_2$, dimethyldiethoxysilane or dimethyldimethoxysilane; for oligomers of the formula $(R_2SiO)_n$ where n=3 to 8, octamethylcyclotetrasiloxane or hexamethylcyclotrisiloxane; for silanes of the general formula $RSi(OR')_3$, methyltrimethoxysilane, phenyltriethoxysilane, 3-chloropropyltrimethoxysilane, 3-mercaptopropyltrimethoxysilane or methacryloxypropyltrimethoxysilane, and, for silanes of the general formula $Si(OR')_4$, tetramethoxysilane or tetraethoxysilane.

In the last step of the preparation process the abovementioned ethylenically unsaturated monomers are grafted onto the polysiloxane graft base. Grafting takes place according to the emulsion polymerization process in the presence of water-soluble or monomer-soluble free-radical initiators. The graft copolymers can be isolated from the emulsion by known methods. For example, by coagulating the latices by means of salt addition or addition of polar solvents or by spray drying.

The degree of crosslinking of the silicone core determines its elastic properties and can be established specifically in a manner familiar to the person skilled in the art by an appropriate choice of the starting components, corresponding alkoxysilanes and/or siloxanes in order to obtain units $(RSiO_{3/2})$ and/or $(SiO_{4/2})$. The incorporation of silane units comprising olefinically unsaturated double bonds, for example vinyl radicals or 3-methacryloxypropyl radicals, permits, in the subsequent graft polymerization, a chemical bonding of the organic-polymer shell to the silicone core by covalent bonds. By choosing suitable monomers for the synthesis of the organic polymer shell b) it is possible to tailor the organic-polymer shells. Thus by grafting a copolymer shell comprising, for example, methyl methacrylate (high Tg) and n-butyl acrylate (low Tg) onto a crosslinked silicone core it is possible to establish specifically the softening temperature of the polymer shell and thereby to match it exactly to the requirements during processing, especially extrusion, of the powder coating components. By grafting a copolymer shell comprising, for example, methyl methacrylate and glycidyl methacrylate onto a crosslinked silicone core, on the one hand it is possible, owing to the epoxide functions in the organic-polymer shell which are introduced with glycidyl methacrylate, to obtain a matrix attachment between modifier particles and binder resin of the powder coating composition, and on the other hand these modifier particles are able to act as crosslinking agents in binders based on polyester resins.

The most preference, accordingly, is for cross-linked silicone elastomer particles with a core comprising $(R_2SiO_{2/2})_x.(RSiO_{3/2})_y$ where x=80–99 mol % and y=1–20 mol %, R being able to be identical or different and having the definition R=methyl, 3-methacryloxy-propyl, and with a shell of poly(methyl methacrylate) or copolymer shells of methyl methacrylate and butyl acrylate or glycidyl methacrylate.

The proportion of the core polymer, based on the total copolymer weight, is particularly preferably 50–75% by weight, and accordingly the proportion of the organic-polymer shell is particularly preferably 25–50% by weight. This corresponds to an organic-polymer degree of grafting of 33–100%.

The additive nature of the silicone elastomer particles with an organic-polymer shell and the ease of incorporation by compounding permit use with all common binder systems for powder coatings. Examples of binder systems for powder coatings are epoxy resins, epoxy-novolak resins, polyester resins, epoxy-polyester resins, polyester hybrid resins, polyacrylate resins, polymethacrylate resins, polyurethane resins, polyethylene resins (HD-PE, LD-PE, LLD-PE), polypropylene resins, polyvinyl chloride resins, ethylene/vinyl acetate copolymers, polyamides and cellulose esters.

The silicone elastomer particles with an organic-polymer shell are generally added in a quantity of from 0.5 to 20% by weight, preferably from 1.0 to 10% by weight, based in each case on the total weight of the silicone elastomer component and binder component. The silicone elastomer particles with an organic-polymer shell can be processed to powder coatings after premixing with binder, pigments and further additives, for example hardener, by extrusion or comparable mixing processes in a temperature range from 5 to 160° C., preferably from 60 to 110° C. This corresponds to the customary procedures for preparing powder coatings. Comminution, grinding and sieving can be carried out in accordance with the state of the art.

In general, the procedure is such that the binder component is precomminuted and is mixed intensively with the silicone elastomer particles, with pigments, catalysts and additives, for example in fluid mixers. The composition passes via a metering device into an extruder, in which the material is melted and homogenized at temperatures which lie above the softening point of the binder and below the activation temperature of the crosslinking catalyst (hardener). The extruded, pastelike material emerges from the extruder die and is then rolled out by rollers to a layer thickness of from 2 to 3 mm, cooled, comminuted and finely ground; finally, the powder is sieved to the desired particle size.

The powder coating compositions obtainable in this way can be processed using the application methods which are known for powder coatings, for example by the electrostatic spraying, electrostatic coating, triboelectric and corona processes, fluidized-bed sintering, electrostatic fluidized-bed sintering, bulk sintering and centrifugal casting. A common feature of all sintering methods is that the material is melted under the influence of heat during film formation; in the case of thermosetting plastics, this is then additionally followed by a curing cycle. A common feature of the electrostatic application methods is that the powder is generally applied to a cold, earthed base material. Owing to their electrostatic charge the powder particles adhere to the workpiece, which is then heated in an oven, whereby the particles melt and—in the case of curable polymers—are cured.

The powder coating composition according to the invention is suitable for all powder coating applications, for example metallic finishing in the automotive sector (clearcoat, topcoat, interior finish, filler, stone-chip protection and underbody protection), of rail-bound vehicles and aircraft (exterior finish), domestic appliances (for example chest freezers, refrigerators, dishwashers), architectural components both external (window frames, exterior panels, doors, gates) and internal (metal furniture, lamp housings), bicycles, snowmobiles, shipping containers, signs, aluminium wheel rims.

In the powder coating compositions according to the invention, the required criterion of microphase separation for improving the impact strength in thermoplastics and thermosets while at the same time retaining the existing polymer properties such as hardness, dimensional stability and mechanical strength is met. In addition to an improvement in the (low-temperature) impact strength, the powder coating compositions also achieve, for example, improved gloss retention (weathering resistance) and scratch resistance, with no adverse effect on hardness, dimensional stability and mechanical strength. The silicone elastomer particles with an organic-polymer shell can be incorporated (compounded) as formulation constituents into powder coating compositions simply and without problems in accordance with conventional process techniques. Contamination problems and flow defects do not occur. Overcoatability of the resulting powder coatings is provided.

The test results in the examples which follow demonstrate that the (impact) toughness of the powder coatings, even at low temperatures, is improved by the addition of silicone elastomer particles with an organic-polymer shell without any adverse effect on the hardness and adhesion of the powder coatings. In addition, the weathering resistance is also improved.

EXAMPLES

Examples 1–2, Comparison Example 1 (Table 1)

A carboxyl-containing polyester powder coating (based on Uralac, DSM) was mixed with 10% by weight (Example 1), 3% by weight (Example 2) and 0% by weight (Comp. Ex. 1) of silicone particles with a core comprising $(R_2SiO_{2/2})_x \cdot (R'SiO_{3/2})_y$ (x=95 mol %, y=5 mol %; R=methyl, R'=methyl, 3-methacryloxypropyl) and a polymethyl methacrylate shell (PMMA degree of grafting 50% by weight, primary particle size 100 nm) and the mixture as extruded (extruder: MP 2000PC, APV-Baker) ground, sieved and then applied to aluminium panels or metal panels by spraying with a powder handgun (ESB Integral 2020, Wagner). The baking operation was carried out at 200° C. for 10 minutes. The test results of the powder coatings are compiled in Table 1.

In addition to the test standards indicated in the table, the following test methods were employed: The Konig pendulum hardness was tested in accordance with DIN 53137. The reverse impact was determined by ball impact testing with the Erichsen ball impact testing instrument model 304.

The cross-hatch was determined using the method according to DIN 53151.

They show that the toughness (reverse impact) and adhesion (cross-hatch, humid climatic conditions) are improved by adding the silicone elastomer powder with a PMMA shell; the hardness is not adversely affected. The measurements of the reduction in gloss after 2000 hours of QUV-B weathering (triple-region gloss meter, Dr. Lange) gave, for the powder coating from Comparison Example 1 in comparison with the powder coating from Example 1, a reduction in gloss which was higher by 200%. The resistance of the powder to QUV-B weathering is likewise improved by adding the silicone elastomer particles with an organic-polymer shell.

Example 3

An acrylate powder coating (based on Alftalat, Hoechst) was mixed with 2% by weight, 5% by weight and 10% by weight of silicone particles as in Example 1–2 and the mixture was extruded (extruder: MP 2000PC, APV-Baker) ground, sieved and then applied to aluminium panels or metal panels by spraying with a powder handgun (ESB Integral 2020, Wagner). The baking operation was carried out at 160° C. for 20 minutes. The measurement results (at −20° C.) showed that with an increasing quantity of silicone elastomer particles with a PMMA shell, from 2% by weight to 10% by weight, the reverse impact value rose by 50%.

Example 4

An epoxy resin powder coating (based on Araldite, Ciba Geigy) was mixed with 5% by weight and 10% by weight of silicone particles as in Example 1–2 and the mixture was extruded (extruder: ZSK 25, Werner & Pfleiderer) and then applied to metal panels by spraying with a powder handgun (Mars II PL-6, Böllhofer). The baking operation was carried out at 180° C. for 10 minutes. The measurement results showed that, with an addition of silicone elastomer particles with a PMMA shell of 5% by weight and 10% by weight, the reverse impact value increased by 10% and 40% respectively. At the same time, the stone-chip resistance was improved.

TABLE 1

|  | Comp. Example 1 | Example 2 | Example 1 |
|---|---|---|---|
| Proportion of silicone elastomer powder with a PMMA shell | 0% by wt. | 3% by wt. | 10% by wt. |
| Average film thickness | 82 μm +− 6 μm | 83 μm +− 4 μm | 80 μm +− 11 μm |
| König pendulum hardness | 148 | 146 | 135 |
| Pencil hardness | 5H | 5H | 5H |
| MEK double rubs | >200 | >200 | >200 |
| Reverse impact in x lbs | 70 | 80 | 89 |
| T-band | 0 | 0 | 0 |
| Salt spray testing according to SS DIN 50 021 Test duration 263 hours | | | |
| Cross-hatch without adhesive tape | Gt 1 | Gt 1 | Gt 1 |
| Cross-hatch with adhesive tape | Gt 1 | Gt 1 | Gt 1 |
| Degree of rusting according to DIN 53 210 | $R_i$ 3 | $R_i$ 3 | $R_i$ 3 |
| Degree of blistering according to DIN 53 209 | no | no | no |
| Rust (Crosscut) | 3 | 3 | 2 |
| Humid climate according to SK DIN 50 017 Test duration 640 hours | | | |
| Cross-hatch without adhesive tape | Gt 4 | Gt 2 | Gt 0 |
| Cross-hatch with adhesive tape | Gt 5 | Gt 3 | Gt 0 |

What is claimed is:

1. Powder coating composition comprising at least one thermoplastic or thermosetting binder and precrosslinked silicone elastomer particles with an organic-polymer shell, the silicone elastomer particles comprising
   a) from about 5 to about 95% by weight, based on the total weight of the copolymer, of a core polymer of the general formula $(R_2SiO_{2/2})_x \cdot (RSiO_{3/2})_y \cdot (SiO_{4/2})_z$ where x=about 5 to about 99.5 mol %, y=about 0.5 to about 95 mol %, z=0 to about 50 mol %, and
   b) from about 5 to about 95% by weight, based on the total weight of the copolymer, of an organic-polymer shell derived from mono- or polyethylenically unsaturated monomers,
with R denoting identical or different monovalent alkyl or alkenyl radicals having 1 to 6 carbon atoms, aryl radicals or substituted hydrocarbon radicals.

2. The composition of claim 1, in which the pre-crosslinked silicone elastomer particles with an organic-polymer shell comprise
   a) from about 20 to about 80% by weight, based on the copolymer total weight, of a core polymer $(R_2SiO_{2/2})_x \cdot (RSiO_{3/2})_y \cdot (SiO_{4/2})_z$ where x=about 50 to about 99 mol %, y=about 1 to about 50 mol %, z=0 to about 20 mol %, and
   b) from about 20 to about 80% by weight, based on the copolymer total weight, of an organic-polymer shell derived from mono- or polyethylenically unsaturated monomers,
with R being as defined above.

3. The composition of claim 1, in which the pre-crosslinked silicone elastomer particles comprise a core comprising $(R_2SiO_{2/2})_x \cdot (RSiO_{3/2})_y$ where x=about 80–99 mol % and y=about 1–20 mol %, wherein each R is identical or different and is a methyl or 3-methacryloxypropyl radical, and with a shell selected from poly(methyl methacrylate) and copolymers derived from methylmethacrylate and butyl acrylate or glycidyl methacrylate.

4. The composition of claim 1, in which the pre-crosslinked silicone elastomer particles with an organic-polymer shell have a mean particle diameter of from about 10 to about 300 nm.

5. The composition of claim 4, in which the pre-crosslinked silicone elastomer particles with an organic-polymer shell have a monomodal particle-size distribution with a maximum polydispersity index of $\sigma_2=0.2$.

6. The composition of claim 5, in which the pre-crosslinked silicone elastomer particles with an organic-polymer shell are present in the powder coating composition in a quantity of from about 0.5 to about 20% by weight, based in each case on the total weight of silicone elastomer component and binder component.

7. A method of making a powder coating composition, said method comprising mixing at least one thermoplastic or thermosetting binder with precrosslinked silicone elastomer particles having an organic-polymer shell, the silicone elastomer particles comprising
   a) from about 5 to 95% by weight, based on the total weight of the copolymer, of a core polymer of the general formula $(R_2SiO_{2/2})_x \cdot (RSiO_{3/2})_y (SiO_{4/2})_z$ where x=about 5 to about 99.5 mol %, y=about 0.5 to about 95 mol %, z=0 to about 30 mol %, and
   b) from about 5 to about 95% by weight, based on the total weight of the copolymer, of an organic-polymer shell derived from mono- or polyethylenically unsaturated monomers,
with R denoting identical or different monovalent alkyl or alkenyl radicals having 1 to 6 carbon atoms, aryl radicals or substituted hydrocarbon radicals.

8. The method of claim 7, in which the precrosslinked silicone elastomer particles with an organic-polymer shell comprise
   a) from about 20 to about 80% by weight, based on the copolymer total weight, of a core polymer $(R_2SiO_{2/2})_x \cdot (RSiO_{3/2})_y \cdot (SiO_{4/2})_z$ where x=about 50 to about 99 mol %, y=about 1 to about 50 mol %, z=0 to about 20 mol %, and
   b) from about 20 to about 80% by weight, based on the copolymer total weight, of an organic-polymer shell derived from mono- or polyethylenically unsaturated monomers,
with R being as defined above.

9. The method of claim 7, in which the precrosslinked silicone elastomer particles comprise a core comprising $(R_2SiO_{2/2})_x \cdot (RSiO_{3/2})_y$ where x=about 80–99 mol % and y=about 1–20 mol %, wherein each R is identical or different and is a methyl or 3-methacryloxypropyl radical, and with a shell selected from poly(methyl methacrylate) and copolymers derived from methylmethacrylate and butyl acrylate or glycidyl methacrylate.

10. The method of claim 7, in which the precrosslinked silicone elastomer particles with an organic-polymer shell have a mean particle diameter of from about 10 to about 300 nm.

11. The method of claim 10, in which the precrosslinked silicone elastomer particles with an organic-polymer shell have a monomodal particle-size distribution with a maximum polydispersity index of $\sigma_2=0.2$.

12. The method of claim 11, in which the precrosslinked silicone elastomer particles with an organic-polymer shell are present in the powder coating composition in a quantity of from about 0.5 to about 20% by weight, based in each case on the total weight of silicone elastomer component and binder component.

* * * * *